March 18, 1930. R. K. HOPKINS 1,751,085
METHOD OF AND APPARATUS FOR FORMING HEADS ON TUBULAR ARTICLES
Filed Sept. 29, 1927 2 Sheets-Sheet 1
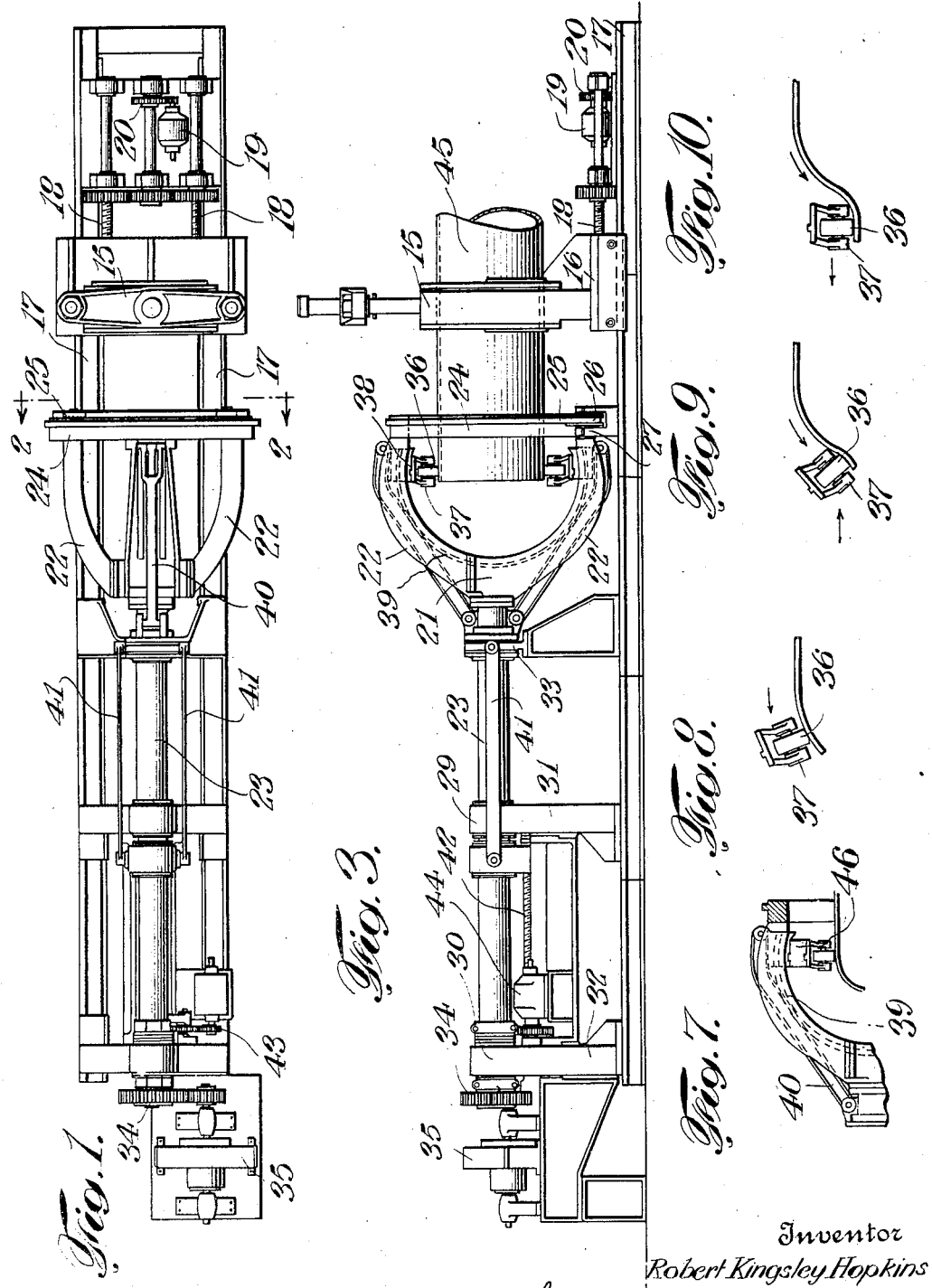
Inventor
Robert Kingsley Hopkins
By his Attorneys
Hoguet & Neary

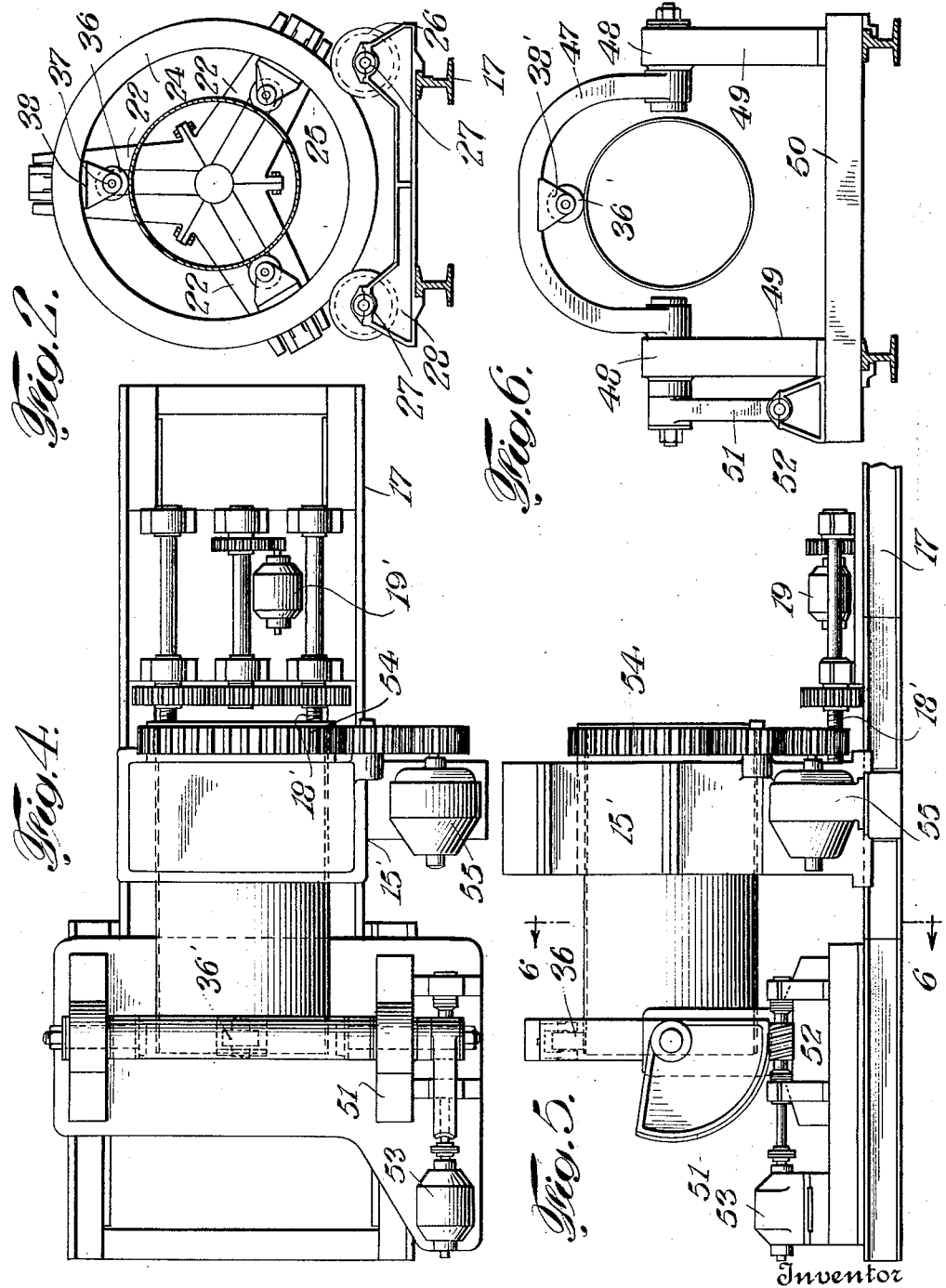

Patented Mar. 18, 1930

1,751,085

UNITED STATES PATENT OFFICE

ROBERT KINGSLEY HOPKINS, OF NEW YORK, N. Y., ASSIGNOR TO THE M. W. KELLOGG COMPANY, A CORPORATION OF DELAWARE

METHOD OF AND APPARATUS FOR FORMING HEADS ON TUBULAR ARTICLES

Application filed September 29, 1927. Serial No. 222,787.

This invention relates to the method of, and apparatus for, forming heads on tubular articles, and in particular to the formation of heads on pipes and tubes used in making pressure vessels, tanks and similar articles of manufacture.

The invention has for an object the formation of heads on tubular articles by rolling in an expeditious and relatively simple manner. Another object of the invention is to insure the production of a head of any desired predetermined curvature. The invention also includes an apparatus for carrying out the head-closing operation with fewer manipulative steps and greater accuracy and efficiency in results than attainable with the apparatus heretofore employed. The invention also has for an object the production of an apparatus for the purpose described which is capable of great flexibility of operation both as to the character and the size of the material worked.

Other objects and advantages of the invention will appear as the description proceeds.
In the drawing, Fig. 1 is a top plan view of a head-forming machine embodying the present invention.

Fig. 2 is a section taken on the line 2—2 of Fig. 1.
Fig. 3 is a side elevation of the machine shown in Fig. 1, but with the roll-supporting arms shown as spaced at an angle of 180° to each other instead of 120° as shown in Figs. 1 and 2, for the purpose of better illustrating the operation of the machine.

Fig. 4 is a top plan view of a modified form of head-forming machine.

Fig. 5 is a side elevation of the machine shown in Fig. 4.
Fig. 6 is a vertical section on the line 6—6 of Fig. 5.

Fig. 7 is a part side elevational and part sectional view through the roll-supporting head illustrating means for adjusting the apparatus for use with tubes of different sizes.

Figs. 8, 9 and 10 are fragmentary views illustrating the various stages in the rolling of one form of head.

In Figs. 1, 2 and 3 of the drawing 15 is a tube-holding or clamping die mounted on a base 16 which in turn is supported by, and slidable along, track members 17. The base 16 is connected to the screw mechanism 18 which is connected by means of a motor 19 or other source of power through suitable gearing 20. Mounted in axial alignment with the tube-holding die is a forming head 21. This forming head 21 is shown as consisting of three arms 22 fastened to a rotatable shaft 23 and having their outer ends secured to an annular member 24 which is provided on its peripheral surface with a tire or bearing portion 25 adapted to rest upon the rolls 26, which latter are supported in bearings 27 carried by a base member 28 supported by the track members 17. The shaft 23 is mounted in the bearings 29 and 30 carried respectively by fixed supports 31 and 32. At its forward end the shaft 23 is also supported in the slidable bearing member 33, the support for which is mounted upon, and adapted to be moved along, the track members 17. On its opposite end the shaft 23 is connected through suitable gearing 34 to a source of power such as the motor 35.

Head-forming rolls 36 are mounted in bearings 37 carried by the cross heads 38 and the latter are slidably mounted upon guideways 39 formed on the arms 22. Movement along the guideways 39 is imparted to the rolls 36 and the cross heads 38 by means of links 40 which are each secured at one end to a cross head 38 and at the other end to the slidable bearing 33. The slidable bearing 33 is in turn connected through links 41 to a screw mechanism 42 which is operated through suitable gearing 43 by a motor 44. The operation of the machine proceeds as follows: A tube 45, which has been heated to a suitable temperature for working, is placed in the die 15 and advanced to a position such that the rolls 36 carried by the forming head 21 may engage the tube at a short distance from its end as shown in Fig. 3. When the tube has been brought to the desired position the cross heads 38 are moved along the guideways 39 by means of the screw mechanism 42, causing the rolls to move downwardly or inwardly over the end of the tube. After the rolls 36 have passed the end of the tube, which has now been turned slightly down, they are set back to their original position, which for convenience may be called the open position. The screw mechanism 18 and motor 19 may then be operated to move the tube-holding die and tube ahead, placing the tube farther under the rolls. The screw mechanism 42 is again operated to draw the rolls down over the end of the tube and form an additional part of the head. By repeating these steps the head is finally formed and closed. It will be understood that for convenience in operation the forming head will be caused to rotate continuously throughout the head-forming operation.

As shown in Figs. 2 and 3 of the drawing the guideways 39 on the arms 22 of the forming head 21 are shaped to form an arc of a circle the center of which is on the center line of the rotatable shaft 23 and of the tube 45. It will be readily apparent that when a roll 36 is mounted on a cross head 38, regardless of how far in from the cross head the face of the roll is, the curve described by this face will be the arc of a circle the radius of which is equal to the outside radius of the largest tube which may be inserted between the rolls 36 when they are in the open position. Owing to this fact, it will be apparent that one forming head is capable of handling several different sizes of tubes and this may be brought about by putting shims or filler blocks 46 between the bearings 37 and the cross heads 38 as indicated in Figure 7.

While the guideways 39 on the arms 22 are shown as being curved to form an arc of a circle, it will be apparent that they may be shaped to give any other desired form of curve to the closed head. However, as the stresses to which the head may be subjected in use are more equally distributed in a hemispherical section, this form is preferred.

If desired, a shape other than truly hemispherical may be imparted to a head formed by means of apparatus having the guide ways 39 curved to form an arc of a circle by causing relative longitudinal movement between the tube and the rotating forming head while the rolling is in progress. Under such operating conditions the curve described would be either a flattened arc or an elongated one, depending upon whether the tube were pushed into the rolls or withdrawn from the rolls.

If it is desired to increase the wall thickness of the head, this may be done by continuing to take smaller bites and passes on the head after it has been completely or nearly closed. An upsetting action resulting in thickening the metal of the head is thus brought about. This is of particular advantage in case, for example, it is desired to provide a nozzle connection from the head, in which event it is desirable to increase the thickness of the metal about the nozzle portion to supply additional strength. Also it may be desirable to equip the head with a manhole opening. This may be brought about by forming the head in the usual manner to a point where the end of the tube assumes a shape similar to that indicated in Fig. 8. When the roll reaches this position the tube is brought forward in a longitudinal direction, while the roll is held stationary on the forming head. The forming head, however, continues to rotate. In bringing the tube forward a bend is started in the head as shown in Fig. 9. The rolls are then put back into the open position, a new bite taken and the rolls brought down to the bend made in the previous step. At this point the rolls are carried out away from the head by withdrawing the tube. This causes a flue neck to be formed in the center of the tube as indicated in Fig. 10. In some cases it may be desirable to roll this flue neck on a mandrel and for this purpose a mandrel may be supported within the tube by a spider or other supporting mechanism not shown, which may be removed after the head is completed.

It is to be borne in mind that the movements described above are relative movements, and that they are not necessarily obtained by a mechanism such as described above. For example, instead of advancing the tube with the die in a longitudinal direction, the machine may be modified so as to advance the rotating head, and in this way obtain all the required motions from the forming head.

It may also be desirable to rotate the tube while maintaining the forming head stationary. An apparatus capable of being used in this manner is shown in Figs. 4, 5 and 6. In this modification the forming head comprises an arcuate supporting arm 47 mounted at each end in bearings 48 carried by bearing supports 49, which in turn are carried by a base plate 50. A roll 36' is mounted in a cross head 38' carried by the arm 47. The arm 47 may be rotated forward through an arc of a circle by means of the arcuate rack bar 51 and the worm 52 which may be actuated by a motor 53. Slidably mounted on the track members 17 is a tube-holding die 15'. The die is adapted to clamp about the tube being worked and has associated therewith means for rotating the die and tube held therein. In the drawing this means is shown as comprising a ring or annular gear 54 carried by the die 15' and connected through suitable gearing to a motor 55, by which the die and tube may be caused to rotate. The die 15', the motor 55 and the mechanism for rotating the die may be moved back and forth along the track by means of the screw mechanism 18' and the motor 19'.

The operation of the modification illustrated in Figs. 4, 5 and 6 may proceed as follows:

A tube is clamped in the die 15', the die and tube are then caused to rotate and are advanced to a point where the roll 36' contacts with the walls of the tube at a point adjacent one end thereof. The roll 36' is then moved forward over the end of the tube describing in its movement an arc of a circle the radius of which is equal to the radius of the tube being worked. The roll 36' is then brought back to the vertical or open position, and the rotating tube is advanced a short distance. The operations are then repeated as before. It will be understood that this form of apparatus may be adjusted for use with tubes of different sizes, the same as the apparatus first above described, by merely inserting shims or filler blocks between the cross head and the roll. This modification of the apparatus is particularly adaptable for use with smaller sized tubes although considerable flexibility of operation is afforded. On the other hand the apparatus first above described, while capable of a great deal of flexibility as to the size of the tubular material worked upon, is especially suitable for use in closing the ends of tubes of relatively large size, for example, tubes having a diameter of from 24" to 72".

It will be understood that various modifications and changes may be made in the apparatus without departing from the scope of the invention. For example, instead of employing three rolls, as shown in Figs. 1, 2 and 3, a greater or less number may be employed. Likewise with the modification shown in Figs. 4, 5 and 6, more than one roll may be employed. It will also be apparent that the principle involved may be carried out with apparatus of other forms than that shown and that the forms shown are to be taken merely as examples of means for carrying out the invention, which is not deemed to be limited except as indicated by the appended claims.

What I claim is:

1. Method of forming heads on tubes which comprises bringing a roll into contact with the external surface of a tube at a point adjacent to, but spaced from, an end thereof, causing relative movement between said roll and said tube simultaneously in a rotary and a longitudinal direction, and causing said roll to move longitudinally of said tube toward the adjacent end thereof and at the same time causing the circle described by the relative rotary movement of the roll and tube to gradually decrease in diameter.

2. Method of forming heads on tubular articles which comprises bringing rolls into contact with the external surface of the article at points adjacent to, but spaced from, an end thereof and causing said rolls to revolve about said tubular article in rolling contact therewith and simultaneously causing said rolls to move longitudinally of said tubular article toward the adjacent end thereof and to inscribe as they revolve about said tubular article a circle of gradually decreasing diameter.

3. Method of forming heads on tubular articles which comprises initiating deformation of the tubular article at a point adjacent to, but spaced from, an end thereof by applying rolling pressure thereto in a circumferential direction, at the same time causing relative movement between the pressure-applying means and the work in a longitudinal direction and the pressure-applying means to approach the adjacent end of the work, and causing the pressure on the work to be gradually increased as the pressure-applying means moves toward the said end of the tubular article.

4. A forming head for a head-forming apparatus comprising a support, a plurality of spaced arms radiating from said support and carrying arcuate guideways, roll-carrying members movable in said guideways, and means movable longitudinally of said support for moving said roll-carrying members along said guideways.

5. A forming head for a head-forming apparatus comprising a rotatable support, a plurality of spaced arms radiating from one end of said support and carrying guideways, roll-carrying members movable in said guideways, means movable longitudinally of said support for moving said roll-carrying members along said guideways and causing said rolls to move longitudinally of the article being worked during the forming operation, means for holding a tubular article in operative relation to said rolls, and means for causing relative movement in a rotary direction between said rolls and a tube disposed in said tube-holding means.

6. A forming head for a head-forming apparatus comprising a support, a plurality of spaced arms radiating from said support and carrying guideways, roll-carrying members movable in said guideways, means for supporting a tubular article in operative relation to said rolls, means for causing relative movement between said rolls and a tube supported in operative relation thereto, and means for moving the said roll-carrying members along said guideways to cause the rolls carried thereby simultaneously to move along the tube in a longitudinal and a rotary direction and to describe a circle of gradually decreasing radius.

In testimony whereof, I have signed my name to this specification this 24th day of September, 1927.

ROBERT KINGSLEY HOPKINS.